(12) United States Patent
Algheryafi et al.

(10) Patent No.: US 11,947,067 B2
(45) Date of Patent: Apr. 2, 2024

(54) SYSTEMS AND METHODS FOR DEVELOPING HORIZONTAL HYDROCARBON WELLS

(71) Applicant: Saudi Arabian Oil Company, Dhahran (SA)

(72) Inventors: Hasan Algheryafi, Dhahran (SA); Kanchan Dasgupta, Al Khobar (SA); Ismail Fahmy, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 264 days.

(21) Appl. No.: 17/023,044

(22) Filed: Sep. 16, 2020

(65) Prior Publication Data

US 2022/0082729 A1    Mar. 17, 2022

(51) Int. Cl.
*G01V 20/00*    (2024.01)
*E21B 7/04*    (2006.01)
*E21B 47/12*    (2012.01)
*E21B 49/02*    (2006.01)
*G06T 17/05*    (2011.01)

(52) U.S. Cl.
CPC ............. *G01V 20/00* (2024.01); *E21B 7/046* (2013.01); *E21B 47/12* (2013.01); *E21B 49/02* (2013.01); *G06T 17/05* (2013.01); *E21B 2200/20* (2020.05)

(58) Field of Classification Search
CPC ...... G01V 99/005; G01V 99/00; E21B 7/046; E21B 47/12; E21B 49/02; E21B 2200/20; E21B 47/138; E21B 33/00; G06T 17/05
USPC .......................................................... 703/10
See application file for complete search history.

(56) References Cited

U.S. PATENT DOCUMENTS

| 5,828,981 A * | 10/1998 | Callender .............. G01V 11/00 |
| | | 702/6 |
| 10,428,642 B2 | 10/2019 | Carpenter et al. |
| 2009/0319243 A1 | 12/2009 | Suarez-Rivera et al. |

(Continued)

OTHER PUBLICATIONS

Michelena et al. "Integrated facies modeling in unconventional reservoirs using a frequentist approach: Example from a South Texas field" 2017 (Year: 2017).*

(Continued)

*Primary Examiner* — Rehana Perveen
*Assistant Examiner* — Troy A Maust
(74) *Attorney, Agent, or Firm* — Bracewell LLP; Constance G. Rhebergen; Brian H. Tompkins

(57) ABSTRACT

Provided are techniques for generating and validating facies logs for a horizontal wellbore, including: obtaining facies data for a subsurface formation, including vertical wellbore core data and wireline log data; determining (based on the facies data) a depositional model; determining (based on the facies data) a facies model of a horizontal portion of a wellbore in an target interval of the formation, including a predicted facies log; determining (based on the depositional model) a facies thickness mapping; determining for different locations within the formation (based on a comparison of the predicted facies log and the facies thickness mapping), a discrepancy between the facies of the predicted facies log and the facies thickness mapping for the location; and for locations of a discrepancy, modifying the predicted facies for the location based on the facies indicated for location by the facies thickness mapping, to generate a modified predicted facies log.

17 Claims, 6 Drawing Sheets

(56) References Cited

U.S. PATENT DOCUMENTS

| | | | |
|---|---|---|---|
| 2012/0221306 A1 | 8/2012 | Hurley et al. | |
| 2013/0297272 A1* | 11/2013 | Sung | G01V 11/00 703/10 |
| 2015/0134255 A1 | 5/2015 | Zhang et al. | |
| 2016/0103245 A1* | 4/2016 | Pyrcz | G01V 99/005 703/2 |
| 2017/0306750 A1 | 10/2017 | Carpenter et al. | |
| 2019/0025461 A1 | 1/2019 | Wiener et al. | |
| 2019/0228121 A1* | 7/2019 | Fung | G06F 30/20 |
| 2020/0103541 A1 | 4/2020 | Mohamed et al. | |

OTHER PUBLICATIONS

AAPG Wiki; "Facies map" available as of Jul. 7, 2020 at: https://wiki.aapg.org/Facies_map; pp. 1-7.

AAPG Wiki; "Lithofacies maps" available as of Jul. 7, 2020 at: https://wiki.aapg.org/Lithofacies_maps; pp. 1-7.

AAPG Wiki; "Seismic facies analysis" available as of Jul. 7, 2020 at: https://wiki.aapg.org/Seismic_facies_analysis; pp. 1-4.

Eltaher, Y. et al.; "Reservoir Surveillance Program Optimization Using Rapid Nuclear Modeling Integrated with Formation Testing and Sampling" SPE-187972-MS, SPE Kingdom of Saudi Arabia Annual Tech. Symp. & Ex., Dammam, Apr. 24-27, 2017; pp. 1-14.

He, Jianhua et al, "Using Neural Networks and the Markov Chain Approach for Facies Analysis and Prediction from Well Logs in the Precipice Sandstone and Evergreen Formation, Surat Basin, Australia" Marine and Petroleum Geology 101 (2019); pp. 410-427.

Historical Geology Laboratory (GEOL 211); "Creating a Lithofacies Map" available as of Jul. 7, 2020 at: bohr.winthrop.edu/faculty/daley/link_to_webpages/courses/geol211/facies.html; pp. 1-3.

PetroWiki; "Density logging" available as of Jul. 13, 2020 at: https://petrowiki.org/Density_logging; pp. 1-6.

PetroWiki; "Neutron porosity logs" available as of Jul. 13, 2020 at: https://petrowiki.org/Neutron_porosity_logs; pp. 1-8.

Saggaf, M.M. et al; Estimation of lithologies and depositional facies from wire-line logs, AAPG Bulletin, v. 84, No. 10, Oct. 2000; pp. 1633-1646.

Yan-Lin, Shao; "3D Geological Modeling and Its Application under Complex Geological Conditions" Procedia Engineering 12 (2011); pp. 41-46.

International Search Report and Written Opinion for International Application No. PCT/US2021/050707, report dated Jan. 18, 2022; pp. 1-19.

Michelena, Reinaldo J. et al.; "Case History Integrated facies modeling in unconventional reservoirs using a frequentist approach: Example from a South Texas field" Geophysics, vol. 82, No. 6, Nov.-Dec. 2017); pp. B219-B230.

Saggaf, Muhammed M.; "Estimation of Lithologies and Depositional Facies from Wireline Logs" SEG Technical Program Expanded Abstracts, Jan. 1, 1998; pp. 2-1 to 2-24.

* cited by examiner

SYSTEMS AND METHODS FOR DEVELOPING HORIZONTAL HYDROCARBON WELLS

FIELD

Embodiments relate generally to developing hydrocarbon reservoirs and, more particularly, to validating and developing horizontal hydrocarbon wells based geological facies.

BACKGROUND

A hydrocarbon reservoir is a pool of hydrocarbons (e.g., oil or gas) trapped in a subsurface rock formation. Hydrocarbon wells are often drilled into hydrocarbon reservoirs to extract (or "produce") the trapped hydrocarbons. These types of wells are typically drilled and operated in a manner to optimize production of hydrocarbons from a reservoir. For example, a reservoir is typically assessed to identify characteristics of the reservoir, the locations and trajectories (or "paths") of wells to be drilled into the reservoir are determined based on the characteristics, the wells are drilled into the reservoir in accordance with the locations and trajectories, and the wells are operated to efficiently extract hydrocarbon production from the reservoir.

A hydrocarbon well traditionally includes a wellbore that extends into the earth. The term "vertical well" is used to describe a well having a wellbore that extends in a generally vertical (e.g., downward) direction. The term "horizontal well" is used to describe a well having a wellbore that extends in a generally horizontal direction. A horizontal well typically includes an upper/vertical wellbore portion that extends downward into the earth, and a lower/horizontal wellbore portion that extends laterally, in a generally horizontal direction. The horizontal wellbore portion may, for example, extend within a target depth range (or "interval") to increase contact with the reservoir. Knowledge of the characteristics of rock along the length of a wellbore of a well can be helpful in developing the well. For example, accurate characterizations of the rock that forms the walls of the wellbore of a well may enable a well operator to make informed decisions regarding drilling, completing and producing the well.

SUMMARY

Although there are numerous existing techniques for determining characteristics of formation rock along the path of a horizontal wellbore, they often suffer from shortcomings. For example, in many instances core samples are extracted from a wellbore during drilling and the cores are assessed in a laboratory to determine characteristics of the formation rock at the corresponding depth. The characteristics for different depths may be assembled to generate a core log that identifies characteristics of the formation rock as a function of depth in the wellbore. These characterizations involve a direct inspection of the samples in a laboratory and are generally considered to be reliable and accurate. Unfortunately, coring can be expensive and difficult to achieve in horizontal portions of wellbores, and, thus, coring may be reserved for assessing vertical portions of wellbores. As a further example, in many instances wireline logging is conducted to determine characteristics of formation rock in-situ. Wireline logging typically includes advancing a logging tool through a wellbore and acquiring measurements along the length of the wellbore to generate a wireline log (or "well log") that identifies characteristics of the formation rock as a function of depth in the wellbore. Although wireline logs can be reliable and accurate, the level of information may be limited by the sensing technology and the ability to accurately interpret the logging data. Moreover, in the case of a well that is not yet drilled, neither coring nor wireline logging may be possible, and characteristics of the formation rock be predicted based on characteristics of nearby wells and data acquired by way of other assessments of the formation.

In some embodiments, provided is a technique for generating and validating facies logs that identify characteristics of formation rock along the length of a horizontal wellbore. In some embodiments, developing a horizontal hydrocarbon well includes the following: (1) obtaining facies data for a subsurface formation, including vertical wellbore core data and wireline log data for the subsurface formation; (2) determining (based on the vertical wellbore core data and the vertical wireline log data) a depositional model of the subsurface formation; (3) determining, based on the facies data, a facies model of a horizontal portion of a wellbore of a hydrocarbon well that extends into a target interval of the subsurface formation, including a predicted facies log that identifies predicted facies of formation rock along a length of the horizontal portion of the wellbore of the hydrocarbon well; (4) determining (based on the depositional model) a facies thickness mapping of the subsurface formation that indicates locations of facies of formation rock in the subsurface formation; (5) determining for each of different locations within the subsurface formation (based on a comparison of the predicted facies log and the facies thickness mapping), a discrepancy between the predicted facies of formation rock indicated for the location by the predicted facies log and the facies of formation rock indicated for the location by the facies thickness mapping; and (6) for some or all of the locations of an identified discrepancy, modifying the predicted facies for the location based on the facies of formation rock indicated for location by the facies thickness mapping, to generate a modified predicted facies log.

In some embodiments, the vertical wellbore core data is obtained by way of core samples extracted from vertical portions of wellbores of wells that extend into the subsurface formation. The vertical wellbore core data may include, for example, characteristics of the core samples measured in a core laboratory (e.g., at the surface) after extraction of the core. In some embodiments, the wireline log data is obtained by way of downhole logging of wellbores of wells that extend into the subsurface formation. The wireline log data may include, for example, characteristics of rock of the subsurface formation measured in-situ by way of one or more downhole logging tools. The wireline log data may include vertical wireline log data that corresponds to downhole logging of vertical portions of the wellbores of the wells that extend into the subsurface formation, and horizontal wireline log data that corresponds to downhole logging of horizontal portions of the wellbores of the wells that extend into the target interval of the subsurface formation.

In some embodiments, a parameter of the horizontal wellbore of the hydrocarbon well is determined based on the modified predicted facies log, and the hydrocarbon well is developed in accordance with the parameter. For example, the parameter may include a drilling parameter (e.g., a well trajectory) and the well may be drilled in accordance with the drilling parameter (e.g., the well may be drilled to follow the well trajectory). As a further example, the parameter may include a completion parameter (e.g., a location of casing perforations) and the well may be completed in accordance with the completion parameter (e.g., the casing may be perforated at the specified location). As yet another example, the parameter may include a production parameter (e.g., an operating pressure or flowrate) and the well may be completed in accordance with the production parameter (e.g., the well may be operated to maintain the production fluid at the operating pressure or flowrate).

Provided in some embodiments is a method of developing a hydrocarbon well that includes the following: obtaining facies data for a subsurface formation, the facies data including: vertical wellbore core data obtained by way of core samples extracted from vertical portions of wellbores of wells that extend into the subsurface formation, the vertical wellbore core data including characteristics of the core samples measured in a core laboratory after extraction of the core; and wireline log data obtained by way of downhole logging of wellbores of wells that extend into the subsurface formation, the wireline log data including characteristics of rock of the subsurface formation measured in-situ by way of a downhole logging tool, the wireline log data including: vertical wireline log data that corresponds to downhole logging of vertical portions of the wellbores of the wells that extend into the subsurface formation; and horizontal wireline log data that corresponds to downhole logging of horizontal portions of the wellbores of the wells that extend into a target interval of the subsurface formation; determining, based on the vertical wellbore core data and the vertical wireline log data, a depositional model of the subsurface formation; determining, based on the facies data, a facies model of a horizontal portion of a wellbore of a hydrocarbon well that extends into the target interval of the subsurface formation, the facies model of the horizontal portion of the wellbore including a predicted facies log that identifies predicted facies of formation rock along a length of the horizontal portion of the wellbore of the hydrocarbon well; determining, based on the depositional model, a facies thickness mapping of the subsurface formation, the facies thickness mapping identifying locations of facies of formation rock in the subsurface formation; determining, based on a comparison of the predicted facies log and the facies thickness mapping, for each of one or more locations within the subsurface formation, a discrepancy between the predicted facies of formation rock indicated for the location by the predicted facies log and the facies of formation rock indicated for the location by the facies thickness mapping; for one or more of the locations of a discrepancy identified, modifying the predicted facies for the location based on the facies of formation rock indicated for location by the facies thickness mapping, to generate a modified predicted facies log; determining, based on the modified predicted facies log, a parameter of the horizontal wellbore of the hydrocarbon well; and developing the hydrocarbon well in accordance with the parameter.

In some embodiments, the comparison of the predicted facies log and the facies thickness mapping includes simultaneous display of the predicted facies of formation rock along the length of the horizontal portion of the wellbore of the predicted facies log and corresponding facies of formation rock of the facies thickness mapping. In some embodiments, the simultaneous display includes display of the locations of predicted facies of formation rock and the corresponding facies of formation rock in three-dimensions and adjacent one another. In some embodiments, the corresponding facies of formation rock are overlaid onto the display of the locations of predicted facies of formation rock. In some embodiments, determining the facies model includes determining the facies model based artificial neural network (ANN) processing of the facies data. In some embodiments, determining a second facies model for the hydrocarbon well is determined based on artificial neural network (ANN) processing of the modified predicted facies log. In some embodiments, the parameter includes a drilling parameter, and developing the hydrocarbon well in accordance with the parameter includes drilling the hydrocarbon well in accordance with the drilling parameter, where the parameter includes a completion parameter, and developing the hydrocarbon well in accordance with the parameter includes completing the hydrocarbon well in accordance with the completion parameter, or where the parameter includes a production parameter, and developing the hydrocarbon well in accordance with the parameter includes producing the hydrocarbon well in accordance with the production parameter.

Provided in some embodiments is a system for developing a hydrocarbon well that includes the following: a processor, and a non-transitory computer readable storage medium including program instructions stored thereon that are executable by the processor to perform the following operations: obtaining facies data for a subsurface formation, the facies data including: vertical wellbore core data obtained by way of core samples extracted from vertical portions of wellbores of wells that extend into the subsurface formation, the vertical wellbore core data including characteristics of the core samples measured in a core laboratory after extraction of the core; and wireline log data obtained by way of downhole logging of wellbores of wells that extend into the subsurface formation, the wireline log data including characteristics of rock of the subsurface formation measured in-situ by way of a downhole logging tool, the wireline log data including: vertical wireline log data that corresponds to downhole logging of vertical portions of the wellbores of the wells that extend into the subsurface formation; and horizontal wireline log data that corresponds to downhole logging of horizontal portions of the wellbores of the wells that extend into a target interval of the subsurface formation; determining, based on the vertical wellbore core data and the vertical wireline log data, a depositional model of the subsurface formation; determining, based on the facies data, a facies model of a horizontal portion of a wellbore of a hydrocarbon well that extends into the target interval of the subsurface formation, the facies model of the horizontal portion of the wellbore including a predicted facies log that identifies predicted facies of formation rock along a length of the horizontal portion of the wellbore of the hydrocarbon well; determining, based on the depositional model, a facies thickness mapping of the subsurface formation, the facies thickness mapping identifying locations of facies of formation rock in the subsurface formation; determining, based on a comparison of the predicted facies log and the facies thickness mapping, for each of one or more locations within the subsurface formation, a discrepancy between the predicted facies of formation rock indicated for the location by the predicted facies log and the facies of formation rock indicated for the location by the facies thickness mapping; for one or more of the locations of a discrepancy identified, modifying the predicted facies for the location based on the facies of formation rock indicated for location by the facies thickness mapping, to generate a modified predicted facies log; determining, based on the modified predicted facies log, a parameter of the horizontal wellbore of the hydrocarbon well; and developing the hydrocarbon well in accordance with the parameter.

Provided in some embodiments is a non-transitory computer readable storage medium having program instructions stored thereon that are executable by a processor to perform the following operations for developing a hydrocarbon well: obtaining facies data for a subsurface formation, the facies data including: vertical wellbore core data obtained by way of core samples extracted from vertical portions of wellbores of wells that extend into the subsurface formation, the vertical wellbore core data including characteristics of the core samples measured in a core laboratory after extraction of the core; and wireline log data obtained by way of downhole logging of wellbores of wells that extend into the subsurface formation, the wireline log data including characteristics of rock of the subsurface formation measured in-situ by way of a downhole logging tool, the wireline log data including: vertical wireline log data that corresponds to downhole logging of vertical portions of the wellbores of the wells that extend into the subsurface formation; and horizontal wireline log data that corresponds to downhole logging of horizontal portions of the wellbores of the wells that extend into a target interval of the subsurface formation; determining, based on the vertical wellbore core data and the vertical wireline log data, a depositional model of the subsurface formation; determining, based on the facies data, a facies model of a horizontal portion of a wellbore of a hydrocarbon well that extends into the target interval of the subsurface formation, the facies model of the horizontal portion of the wellbore including a predicted facies log that identifies predicted facies of formation rock along a length of the horizontal portion of the wellbore of the hydrocarbon well; determining, based on the depositional model, a facies thickness mapping of the subsurface formation, the facies thickness mapping identifying locations of facies of formation rock in the subsurface formation; determining, based on a comparison of the predicted facies log and the facies thickness mapping, for each of one or more locations within the subsurface formation, a discrepancy between the predicted facies of formation rock indicated for the location by the predicted facies log and the facies of formation rock indicated for the location by the facies thickness mapping; for one or more of the locations of a discrepancy identified, modifying the predicted facies for the location based on the facies of formation rock indicated for location by the facies thickness mapping, to generate a modified predicted facies log; determining, based on the modified predicted facies log, a parameter of the horizontal wellbore of the hydrocarbon well; and developing the hydrocarbon well in accordance with the parameter. In some embodiments, the comparison of the predicted facies log and the facies thickness mapping includes simultaneous display of the predicted facies of formation rock along the length of the horizontal portion of the wellbore of the predicted facies log and corresponding facies of formation rock of the facies thickness mapping. In some embodiments, the simultaneous display includes display of the locations of predicted facies of formation rock and the corresponding facies of formation rock in three-dimensions and adjacent one another. In some embodiments, the corresponding facies of formation rock are overlaid onto the display of the locations of predicted facies of formation rock In some embodiments, determining the facies model includes determining the facies model based artificial neural network (ANN) processing of the facies data. In some embodiments, determining a second facies model for the hydrocarbon well is determined based on artificial neural network (ANN) processing of the modified predicted facies log.

Figure 1:
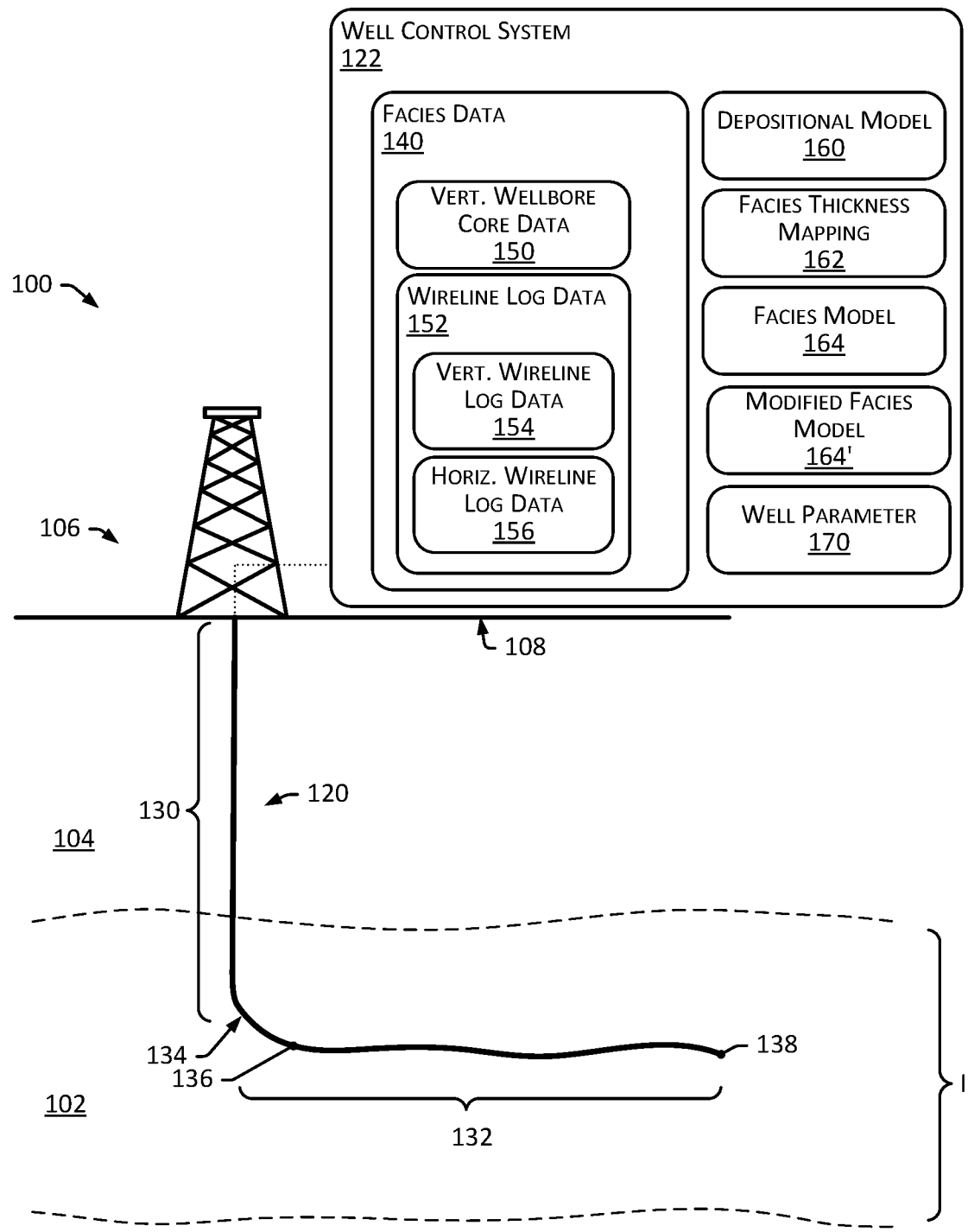
FIG. 1 is diagram that illustrates a well environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of generating, validating and employing facies logs that identify characteristics of formation rock along the length of a horizontal wellbore. In some embodiments, developing a horizontal hydrocarbon well includes the following: (1) obtaining facies data for a subsurface formation, including vertical wellbore core data and wireline log data for the subsurface formation; (2) determining (based on the vertical wellbore core data and the vertical wireline log data) a depositional model of the subsurface formation; (3) determining, based on the facies data, a facies model of a horizontal portion of a wellbore of a hydrocarbon well that extends into a target interval of the subsurface formation, including a predicted facies log that identifies predicted facies of formation rock along a length of the horizontal portion of the wellbore of the hydrocarbon well; (4) determining (based on the depositional model) a facies thickness mapping of the subsurface formation that indicates locations of facies of formation rock in the subsurface formation; (5) determining for each of different locations within the subsurface formation (based on a comparison of the predicted facies log and the facies thickness mapping), a discrepancy between the predicted facies of formation rock indicated for the location by the predicted facies log and the facies of formation rock indicated for the location by the facies thickness mapping; and (6) for some or all of the locations of an identified discrepancy, modifying the predicted facies for the location based on the facies of formation rock indicated for location by the facies thickness mapping, to generate a modified predicted facies log.

In some embodiments, the vertical wellbore core data is obtained by way of core samples extracted from vertical portions of wellbores of wells that extend into the subsurface formation. The vertical wellbore core data may include, for example, characteristics of the core samples measured in a core laboratory (e.g., at the surface) after extraction of the core. In some embodiments, the wireline log data is obtained by way of downhole logging of wellbores of wells that extend into the subsurface formation. The wireline log data may include, for example, characteristics of rock of the subsurface formation measured in-situ by way of one or more downhole logging tools. The wireline log data may include vertical wireline log data that corresponds to downhole logging of vertical portions of the wellbores of the wells that extend into the subsurface formation, and horizontal wireline log data that corresponds to downhole logging of horizontal portions of the wellbores of the wells that extend into the target interval of the subsurface formation.

In some embodiments, a parameter of the horizontal wellbore of the hydrocarbon well is determined based on the modified predicted facies log, and the hydrocarbon well is developed in accordance with the parameter. For example, the parameter may include a drilling parameter (e.g., a well trajectory) and the well may be drilled in accordance with the drilling parameter (e.g., the well may be drilled to follow the well trajectory). As a further example, the parameter may include a completion parameter (e.g., a location of casing perforations) and the well may be completed in accordance with the completion parameter (e.g., the casing may be perforated at the specified location). As yet another example, the parameter may include a production parameter (e.g., an operating pressure or flowrate) and the well may be completed in accordance with the production parameter (e.g., the well may be operated to maintain the production fluid at the operating pressure or flowrate).

FIG. 1 is a diagram that illustrates a well environment 100 in accordance with one or more embodiments. In the illustrated embodiment, the well environment 100 includes a reservoir ("reservoir") 102 located in a subsurface formation ("formation") 104, and a well system ("well") 106.

The formation 104 may include a porous or fractured rock formation that resides beneath the Earth's surface 108. The reservoir 102 may be a hydrocarbon reservoir defined by a portion of the formation 104 that contains (or that is determined to contain) a subsurface pool of hydrocarbons (e.g., oil and gas), and the well 106 may be a hydrocarbon well (e.g., an oil and gas well) that is operable to extract the hydrocarbons from the reservoir 102. The formation 104 and the reservoir 102 may each include different layers of rock having varying characteristics, such as varying degrees of lithology, permeability, porosity and fluid saturation. In the case of the well 106 being operated as a hydrocarbon production well, the well 106 may facilitate the extraction of hydrocarbons (or "production") from the reservoir 102. In the case of the well 106 being operated as an injection well, the well 106 may facilitate the injection of substances (e.g., gas or water) into the formation 104. In the case of the well 106 being operated as a monitoring well, the well 106 may facilitate the monitoring of various characteristics of the formation 104, such as reservoir saturation or reservoir pressure.

The well 106 may include a wellbore 120 and a well control system ("control system") 122. The control system 122 may control various operations of the well 106, such as well drilling operations, well completion operations, well production operations, or well and formation testing and monitoring operations. In some embodiments, the control system 122 includes a computer system that is the same as or similar to that of computer system 1000 described with regard to at least FIG. 7.

The wellbore 120 may include a bored hole (or "borehole") that extends from the surface 108 into a target zone of the formation 104, such as the reservoir 102. An upper end of the wellbore 120 located at or near the surface 108 may be referred to as the "up-hole" end of the wellbore 120. A lower end of the wellbore 120 that terminates in the formation 104 may be referred to as a "down-hole" end of the wellbore 120. The wellbore 120 may be created, for example, by a drill bit boring through the formation 104.

The wellbore 120 may be a horizontal wellbore defined a vertical wellbore portion 130 and a horizontal wellbore portion 132. The vertical wellbore portion 130 may extend downward from the surface 108 in a generally vertical trajectory. The horizontal wellbore portion 132 may extend from a down-hole end of the vertical wellbore portion 130 in a generally horizontal trajectory. The vertical wellbore portion 130 may, for example, include a vertical segment of the wellbore 120 that extends downward from the surface 108 (e.g., extending along a trajectory having a slope (or "gradient") of about +/−15° from vertical). The vertical wellbore portion 130 may deviate from its generally vertical orientation at a kick-off-point (KOP) 134 and extend into a bend (or "curve") that terminates at a start (or "heel" or "lateral heel") 136 of the horizontal wellbore portion 132. The horizontal wellbore portion 132 may include, for example, a segment of the wellbore 120 that extends in a generally horizontal orientation from the heel 136 to a down-hole end (or "toe" or "lateral toe") 138 of the wellbore 120, and that follows a generally horizontal trajectory (e.g., a trajectory having a slope (or "gradient") of about +/−15° from horizontal). The heel 136 may be defined as a point at which the wellbore 120 achieves a target orientation within the reservoir 102. The toe 138 may be defined by the down-hole end of the wellbore 120. A length of the horizontal wellbore portion 132 (or "lateral length") may be defined by a distance between the heel 136 and the toe 138 of the wellbore 120. As described here, facies of the formation rock along the lateral length of the well 106 may be determined, for example, by way of modification and verification of a predicted facies log for the horizontal wellbore portion 132.

In some embodiments, the control system 122 stores, or otherwise has access to, facies data 140. The facies data 140 may include data that is indicative of various characteristics of the rock of the formation 104 surrounding the well 106. In some embodiments, the facies data 140 includes vertical wellbore core data 150 and wireline log data 152. In some embodiments, the vertical wellbore core data 150 includes core data obtained by way of core samples extracted from vertical portions of wellbores of wells that extend into the formation 104. For example, the vertical wellbore core data 150 may include core data obtained by way of core samples extracted from vertical wellbore portions of 10 different wells in a region that is proximate the well 106 and that extend into the formation 104 (e.g., core data for core samples extracted from vertical wellbores within a 10 kilometer radius of the well 106). In some embodiments, the core data include characteristics of the core samples measured in a core laboratory. For example, the core data may include density, porosity, or other characteristics of the core samples measured in a core laboratory at the surface 108, after extraction of the core sample from their respective wellbores. The core data may be assembled to generate core logs that indicate characteristics of the formation 104 as a function of depth in the respective wellbores.

In some embodiments, wireline log data 152 includes well log data obtained by way of downhole logging of wellbores of wells that extend into the subsurface formation. For example, the wireline log data 152 may include well log data obtained by way of downhole logging of vertical and horizontal portions of wellbores of 20 different wells in the region that is proximate the well 106 and that extend into the formation 104 (e.g., wireline log data 152 for vertical and horizontal wellbore portions within the 10 kilometer radius of the well 106).

In some embodiments, the wireline log data 152 includes characteristics of the rock of the formation 104 measured in-situ by way of a downhole logging tool. For example, the core data may include density, porosity, or other characteristics of the core samples measured by way of a logging tool that is operated to acquire measurements of surrounding portions of the formation 104 as the tool is advanced along the wellbore of the well. This may include use of a density logging tool to acquire measurements indicative of density of the formation 104, a porosity logging tool to acquire measurements indicative of porosity of the formation 104, a gamma ray logging tool to acquire measurements indicative of radioactivity of the formation 104, and a resistivity logging tool to acquire measurements indicative of electrical resistivity of the formation 104. In some embodiments, the wireline log data 152 includes at least four common types of logs (e.g., density, porosity, gamma ray, and resistivity) for each of the wellbores, and the logged wellbore portions include a horizontal wellbore portion that remains within a given (or "target") depth interval, such as the depth interval (I) associated with the reservoir 102. In some embodiments, the gamma ray log (e.g., including a log indicative of measured radioactivity of the formation 104 as function of depth) is utilized to distinguish sand and shale intervals (e.g., in a siliciclastics reservoir), the density log (e.g., including a log indicative of measured density of the formation 104 as function of depth) is utilized for lithology and porosity identification, the porosity log (e.g., including a log indicative of measured porosity of the formation 104 as function of depth) is used to identify the pay zones, and the resistivity log (e.g., including a log indicative of measured resistivity of the formation 104 as function of depth) is used to identify the fluid type.

The wireline log data 152 may include vertical wireline log data 154 and horizontal wireline log data 156. The vertical wireline log data 154 may include the log data associated vertical wellbore portions. The horizontal wireline log data 156 may include the log data associated horizontal wellbore portions. For example, the vertical wireline log data 154 may include measurements that corresponds to downhole logging of vertical portions of the wellbores of the 20 wells that extend into the formation 104, and the horizontal wireline log data 156 may include measurements that correspond to downhole logging of horizontal portions of the wellbores of the 20 wells that extend into the target interval of the formation 104.

In some embodiments, a depositional model 160 is generated for the formation 104. This may include a modeling of the formation 104 that indicates locations of different types of rock within the formation 104. For example, a depositional model 160 of the formation 104 may include a three dimensional (3D) grid that maps the types and locations of formation rock across the region that is proximate the well 106. Each of the different type of rocks may be defined by common set of characteristics for the type of rock, such as a given range of density, porosity, or the like. In some embodiments, the depositional model 160 is generated based on facies data 140. For example, a depositional model 160 of the formation 104 may include a three dimensional (3D) grid that maps the types and locations of formation rock across the region that is proximate the well 106 based on characteristics of the rock of the formation 104 provided in vertical wellbore core data 150 and the wireline log data 152 of the facies data 104.

In some embodiments, a facies thickness mapping 162 is generated for the formation 104. A facies thickness mapping 162 may include a modeling of the formation 104 that indicates boundaries of different types of rock within the formation 104. For example, a facies thickness mapping 162 of the formation 104 may include a three dimensional (3D) grid that maps the upper and lower bounds of pockets or layers of different types of formation rock across the region that is proximate the well 106. In some embodiments, the facies thickness mapping 162 is generated based on the depositional model 160 for the formation 104. For example, upper and lower bounding surfaces of the facies thickness mapping 162 may be generated based on the types and locations of formation rock across the region that is proximate the well 106 indicated by the 3D mapping of the depositional model 160.

In some embodiments, a facies model 164 is generated for the well 106. A facies model 164 may include identification of types of rock located along the trajectory of the wellbore 120. For example, a facies model 164 for the wellbore 120 may include a mapping of the different types of rocks versus depth in the wellbore 120. In some embodiments, the facies model 164 is generated using an artificial neural network (ANN). For example, the facies data 140 may be input to an ANN that identifies patterns and signals in the facies data 140, and generates a corresponding facies model of the well 106 that includes a facies log that includes estimates (or "predictions") of the characteristics and types of formation rock along the length of the wellbore 120 as function of location (e.g., depth) in the wellbore 120. In some embodiments, the ANN correlates the values and trends of the previously mentioned wireline logs 154 with vertical core data 150 to predict the facies data 140 in horizontal wells.

In some embodiments, the facies model 164 is compared to the facies thickness mapping 162 to identify potential inaccuracies of the facies model 164. For example, for each of multiple discrete locations within the formation 104, a corresponding first facies indicated for the location by the facies model 164 may be compared to a corresponding second facies for the location indicated by the facies thickness mapping 162 to determine whether there is a discrepancy between the first and second facies indicated. For example, if both of the first and second facies indicate the same type rock (e.g., Rock Type A), then it may be determined that there is no discrepancy for the corresponding location. If, however, the first and second facies indicate different types rock (e.g., the first facies indicates Rock Type A at the location and the second facies indicates Rock Type B at the location), then it may be determined that there is a discrepancy for the corresponding location. In some embodiments, in response to identifying a discrepancy for a location, the facies at the location may be further assessed to identify a correct facies for the location, and the facies model 164 may be updated as needed, to generate a corresponding modified facies model 164'. For example, the facies for the location in the facies model 164 may be changed from "Rock Type A" to "Rock Type B" to generate a modified facies model 164' that reflects the facies indicated for the location by the facies thickness mapping 162.

In some embodiments, the modified facies model 164' is used as a basis for subsequent processing, such as a subsequent assessment by an ANN. For example, the modified facies model 164' may be provided as an input to an ANN (e.g., in place of the corresponding facies model 164). Such iterative adjustments to the input of the ANN may provide for fine-tuning of the ANN processing and output.

In some embodiments, the modified facies model 164' is used as a basis for determining parameters 170 for the well 106. For example, a well parameter 170 of the horizontal wellbore of the well 106 may be determined based on the modified facies model 164', and the well 106 may be developed in accordance with the parameter. The well parameter 170 may include, for example, a drilling parameter (e.g., a well trajectory) and the well 106 may be drilled in accordance with the drilling parameter (e.g., the well 106 may be drilled to follow the well trajectory). As a further example, the well parameter 170 may include a completion parameter (e.g., a location of casing perforations) and the well 106 may be completed in accordance with the completion parameter (e.g., the casing of the well 106 may be perforated at the specified location). As yet another example, the well parameter 170 may include a production parameter (e.g., an operating pressure or flowrate) and the well 106 may be completed in accordance with the production parameter (e.g., the well 106 may be operated to maintain production fluid at the operating pressure or flowrate).

Figure 2:
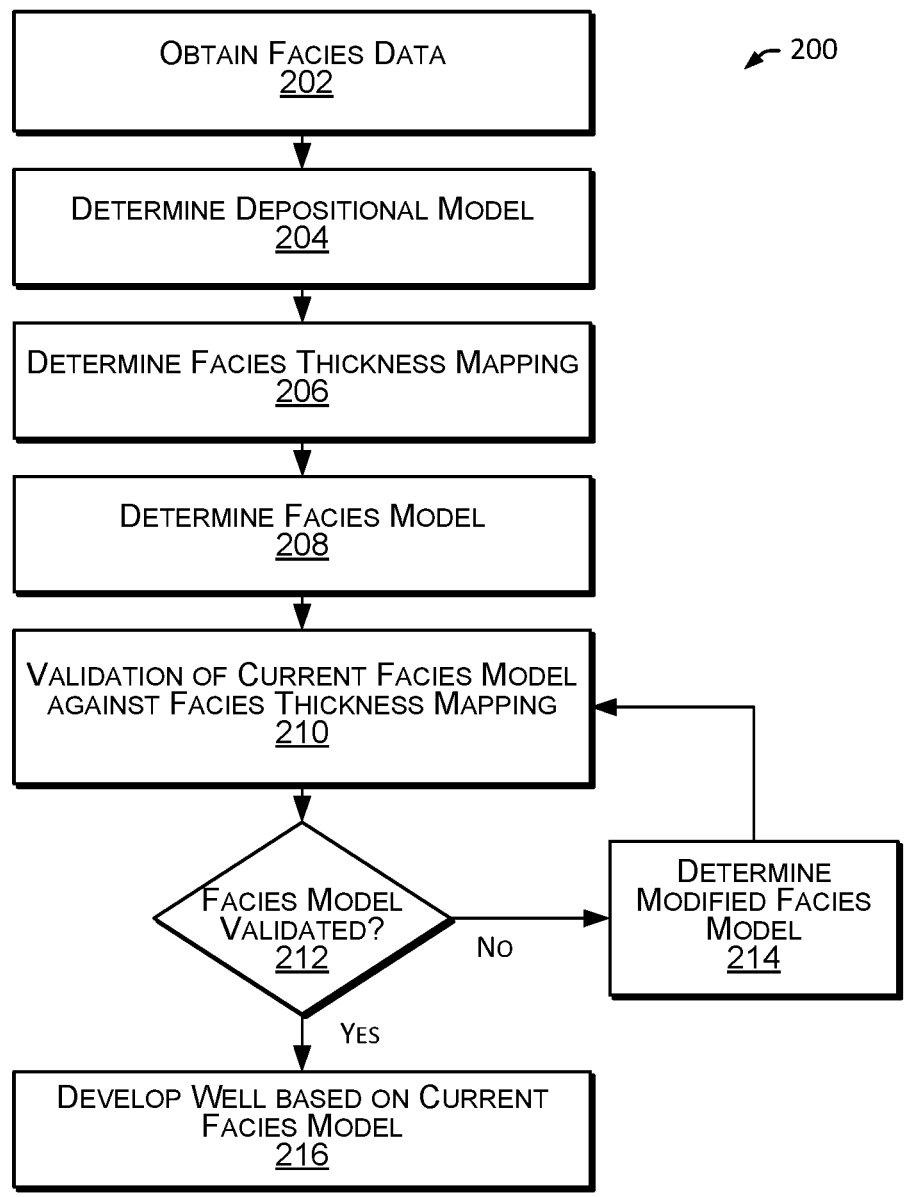
FIG. 2 is a flowchart that illustrates a method of developing a horizontal well by way of facies validation in accordance with one or more embodiments.

FIG. 2 is a flowchart that illustrates a method 200 of developing a horizontal hydrocarbon well based on generation and validation of facies logs, in accordance with one or more embodiments. In the context of the well 106, the operations of method 200 may be performed, for example, by the control system 122 (or another operator of the well 106). For example, a processing module of the control system 122 may perform one or more of the data processing operations described, such as those directed to obtaining facies data for a subsurface formation, determining a depositional model of the subsurface formation, determining a facies thickness mapping of the subsurface formation, determining a facies model for a well in the subsurface formation, validating and modifying the facies model. A well operator, such as a control module of the control system 122 (or well personnel), may develop the reservoir 102 based on the well parameter(s) 170. For example, a control module of the control system 122 (or well personnel) may develop the reservoir 102 by controlling a well drilling, completion or production system to drill, complete or produce the well 106, respectively.

In some embodiments, method 200 includes obtaining facies data (block 202). This may include obtaining facies data for a subsurface formation, including vertical wellbore core data and wireline log data for the subsurface formation. For example, obtaining facies data may include the control system 122 obtaining facies data 140 that is indicative of various characteristics of the rock of the formation 104 surrounding the well 106. This may include vertical wellbore core data 150 and wireline log data 152 for the formation 104. The vertical wellbore core data 150 may include, for example, core data obtained by way of core samples extracted from vertical wellbore portions of 10 different wells in a region that is proximate the well 106 and that extend into the formation 104 (e.g., core data for core samples extracted from vertical wellbores within a 10 kilometer radius of the well 106). The wireline log data 152 may include, for example, well log data obtained by way of downhole logging of vertical and horizontal portions of wellbores of 20 different wells in the region that is proximate the well 106 and that extend into the formation 104 (e.g., wireline log data 152 for vertical and horizontal wellbores within the 10 kilometer radius of the well 106). The wireline log data 152 may include vertical wireline log data 154 and horizontal wireline log data 156. The vertical wireline log data 154 may include, for example, measurements that corresponds to downhole logging of vertical portions of the wellbores of the 20 wells that extend into the formation 104. The horizontal wireline log data 156 may include, for example, measurements that correspond to downhole logging of horizontal portions of the wellbores of the 20 wells that extend into the target interval of the formation 104.

In some embodiments, method 200 includes determining a depositional model (block 204). This may include determining a depositional model of a subsurface formation based on facies data for the formation. Continuing with the prior example, determining a depositional model may include the control system 122 determining a depositional model 160 of the formation 104 based on the facies data 140 obtained.

Figure 3:
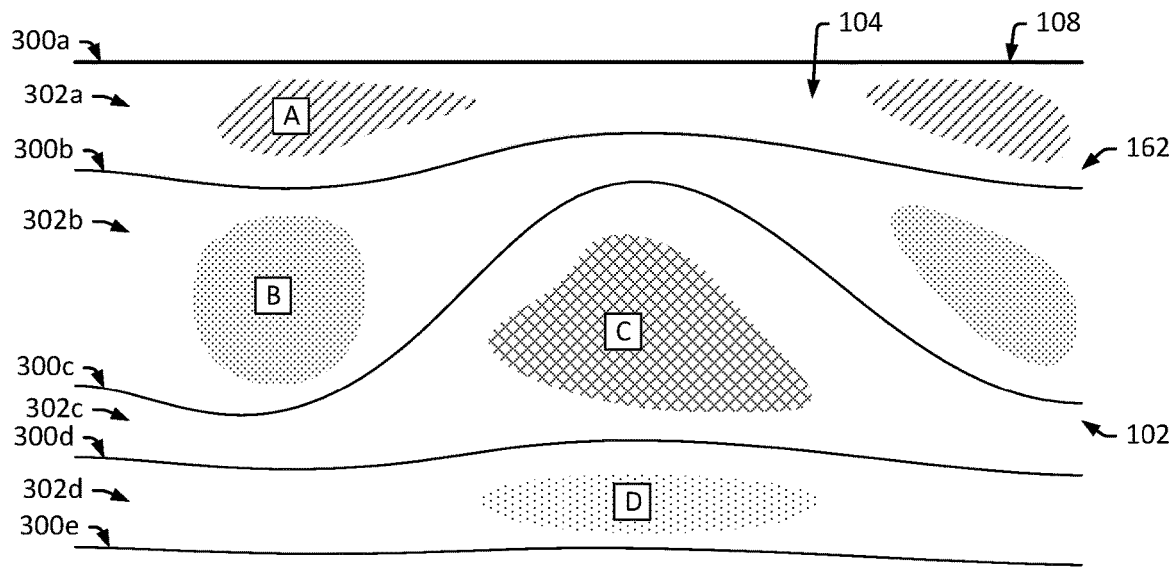
FIG. 3 is a diagram that illustrates an example facies thickness mapping in accordance with one or more embodiments.

In some embodiments, method 200 includes determining a facies thickness mapping (block 206). This may include determining a facies thickness mapping of a subsurface formation based on depositional model for the formation. Continuing with the prior example, determining a facies thickness mapping may include the control system 122 determining a facies thickness mapping 162 of the formation 104 based on the depositional model 160 of the formation 104. FIG. 3 is a diagram that illustrates an example facies thickness mapping 162 in accordance with one or more embodiments. In the illustrated embodiment, the facies thickness mapping 162 includes first, second, and third boundaries 300a-300e that define bounding surfaces of first, second, third, and fourth rock layers 302a-300d that form a portion of the formation 104. The first boundary may include the earth's surface 108. The second and third layers may define a reservoir 102 that defines a target interval of the formation 104. Although the boundaries 300a-300e and layers 302a-300d are illustrated in two-dimensions for the purpose of illustration and explanation, the boundaries and layers may extend in three dimensions. The first, second, third, and fourth layers 302a-300d may, for example, contain first, second, third and fourth types of rock (e.g., rock types A, B, C and D, respectively).

Figure 4:
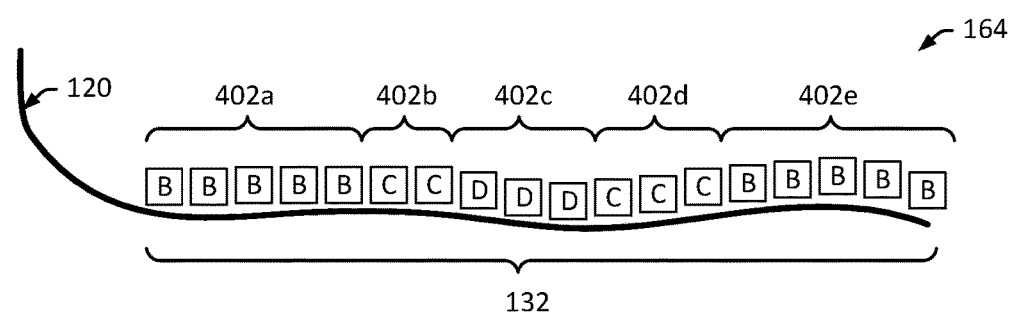
FIG. 4 is a diagram that illustrates an example facies model in accordance with one or more embodiments.

In some embodiments, method 200 includes determining a facies model (block 208). This may include determining a facies model for a wellbore extending into a subsurface formation based on facies data for the formation. Continuing with the prior example, determining a facies model may include the control system 122 determining a facies model 164 for the horizontal portion 132 of the wellbore 120 in the subsurface formation 104 based on facies data 140 for the formation 104. In some embodiments, the facies model is determined by way of an ANN. FIG. 4 is a diagram that illustrates an example facies model 164 in accordance with one or more embodiments. In the illustrated embodiment, the facies model 164 includes a facies logging that identifies the determined types of rocks (e.g., Rock Types B, C and D) across the length of the horizontal portion 132 of the wellbore 120. For example, first, second, third, fourth and fifth intervals 402a, 402b, 402c, 402d and 402e of the horizontal portion 132 of the wellbore 120 are predicted to have rock types of B, C, D, C and B, respectively. Although the facies model 164 is illustrated in a two-dimensional graphical depiction of the wellbore 120 for the purpose of illustration and explanation, the facies model 164 may be presented in three dimensions (e.g., as a 3D graphical depiction of the rock types along the trajectory of the wellbore 120), or may be presented a table or chart that logs rock types versus location (e.g., depth) in the wellbore 120.

In some embodiments, method 200 includes conducting validation of a facies model against a facies thickness mapping (block 210). This may include conducting a comparison of the facies model against the facies thickness mapping to identify consistencies or inconsistencies between the facies indicated by the facies model and the facies indicated by the facies thickness mapping. For example, validating the facies model against the facies thickness mapping may include the control system 122, for each of discrete locations within the formation 104 along the horizontal portion 132 of the wellbore 120, comparing a corresponding first facies (e.g., a rock type) indicated for the location by the current facies model 164 to a corresponding second facie for the location indicated by the facies thickness mapping 162 to determine whether there is a discrepancy between the first and second facies indicated for the location. For example, if both of the first and second facies indicate the same type rock (e.g., Rock Type C), then it may be determined that there is no discrepancy for the corresponding location. If, however, the first and second facies indicate different types rock (e.g., the first facies indicates Rock Type C at the location and the second facies indicates Rock Type D at the location), then it may be determined that there is a discrepancy for the corresponding location. In response to determining that there are one or more discrepancies (e.g., at least a threshold number of discrepancies), the current facies model 164 may not be validated (block 212), and the method 200 may proceed to determining a modified facies model 166 for validation (see, e.g., block 214). In response to determining that there are no discrepancies, or few discrepancies (e.g., less than the threshold number of discrepancies), the current facies model 164 may be validated (block 212), and the method 200 may proceed to developing a well based on the current facies model 166 (see, e.g., block 216).

Figure 5A:
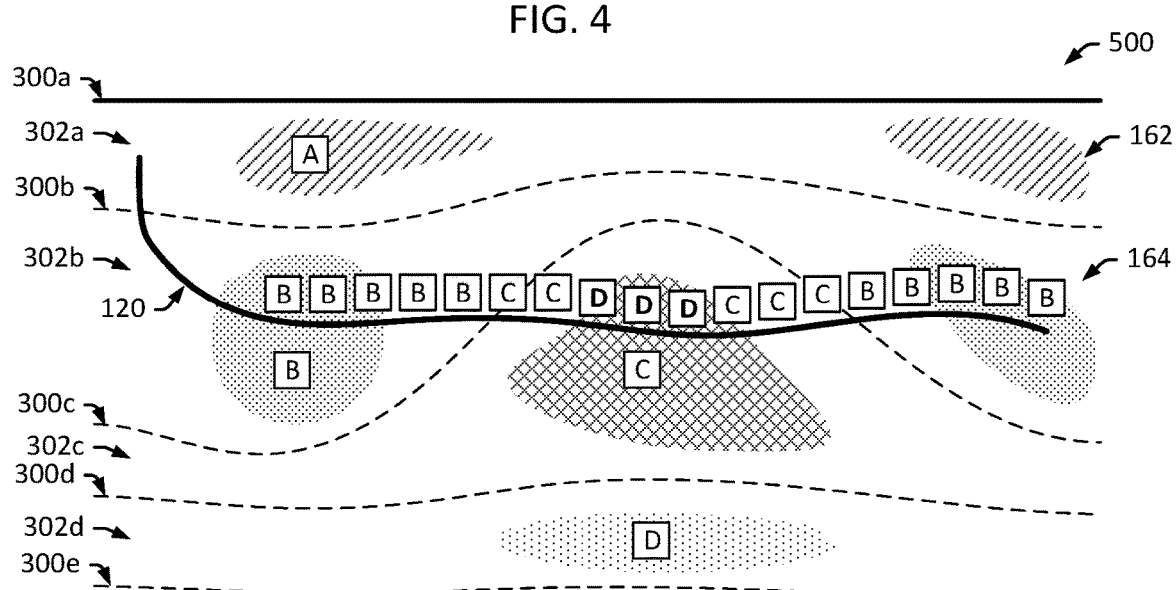
FIGS. 5A and 5B are diagrams that illustrate an example depictions of a facies model and a facies thickness diagram in accordance with one or more embodiments.
Figure 5B:
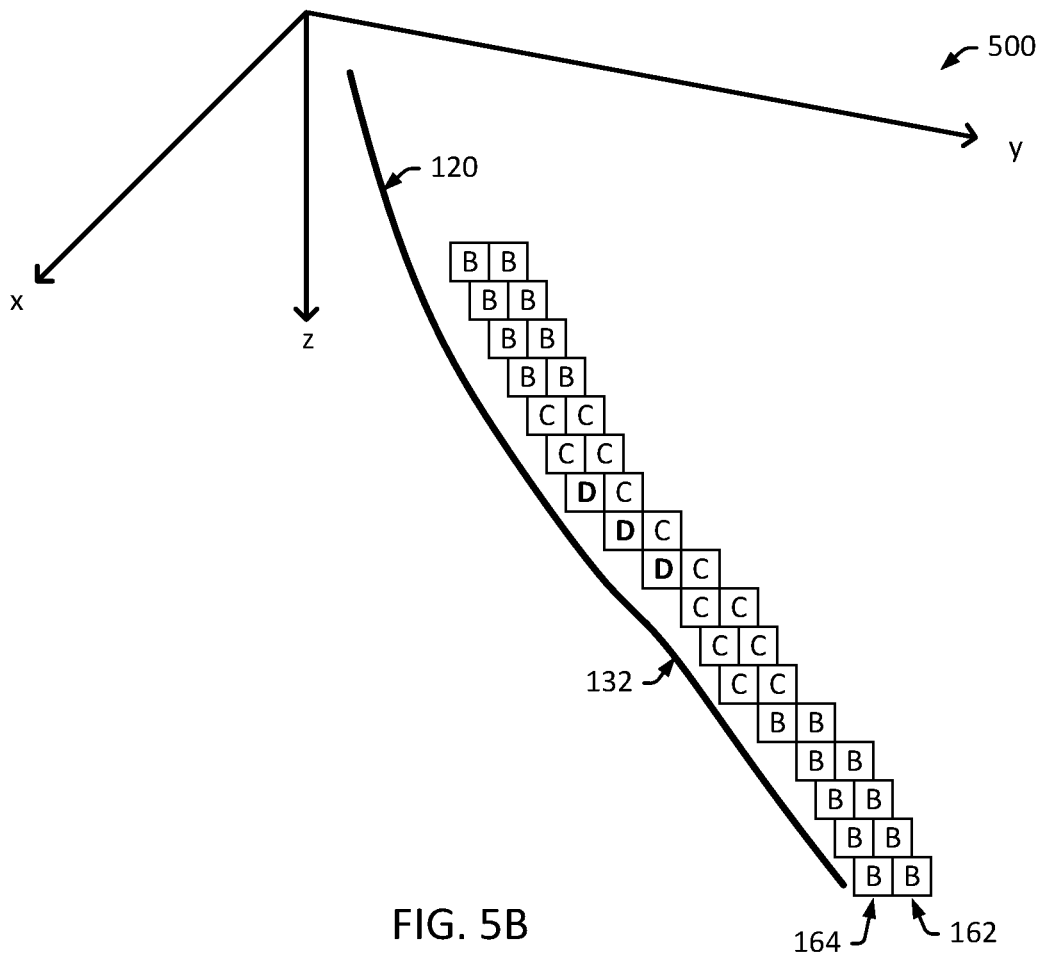

In some embodiments, the validation includes generating a validation visualization that includes a visual depiction of the facies indicated by the facies thickness mapping 162 in conjunction with a visual depiction of the facies indicated by the facies model 164. For example, a transparent visual depiction of the facies thickness mapping 162 (e.g., including a visual indicator of the second facies at each location, such as by way of a given color, pattern, or symbol) may be displayed over a visual depiction of the facies model 164 (e.g., including a visual indicator of the first facies at each location, such as by way of a given color, pattern, or symbol), and a user (e.g., a well operator) may conduct a visual inspection of the visual indication of the first and second facies at each of the locations to identify discrepancies there between. In some embodiment, locations of discrepancies may be emphasized (e.g., visually highlighted). FIG. 5A is a diagram that illustrates an example validation visualization 500 of a facies model and a facies thickness diagram in accordance with one or more embodiments. In the illustrated embodiment, the validation visualization 500 includes a two-dimensional (2D) visualization that illustrates 2D visualizations of the boundaries 300a-300e and layers 302a-302d overlaid onto a 2D visualization of the current facies model 164 and the wellbore 120, which includes textual indications of the rock types (e.g., B, C, or D) at corresponding locations across the length of the horizontal portion 132 of the wellbore 120. Notably, the three rock types of "D" indicated in the middle segment of the horizontal portion 132 of the wellbore 120 conflict with the rock type "C" associated with the third layer 302c, and are bolded to highlight the discrepancy between the first facies (e.g., Rock Type D) and the second facies (e.g., Rock Type C). In some embodiments, the validation visualization 500 includes a 3D visualization. FIG. 5B is a diagram that illustrates a validation visualization 500 that includes 3D visualizations of the first and the second facies presented adjacent one another, along a 3D representation of the trajectory of the horizontal portion 132 of the wellbore 120.

Figure 6A:
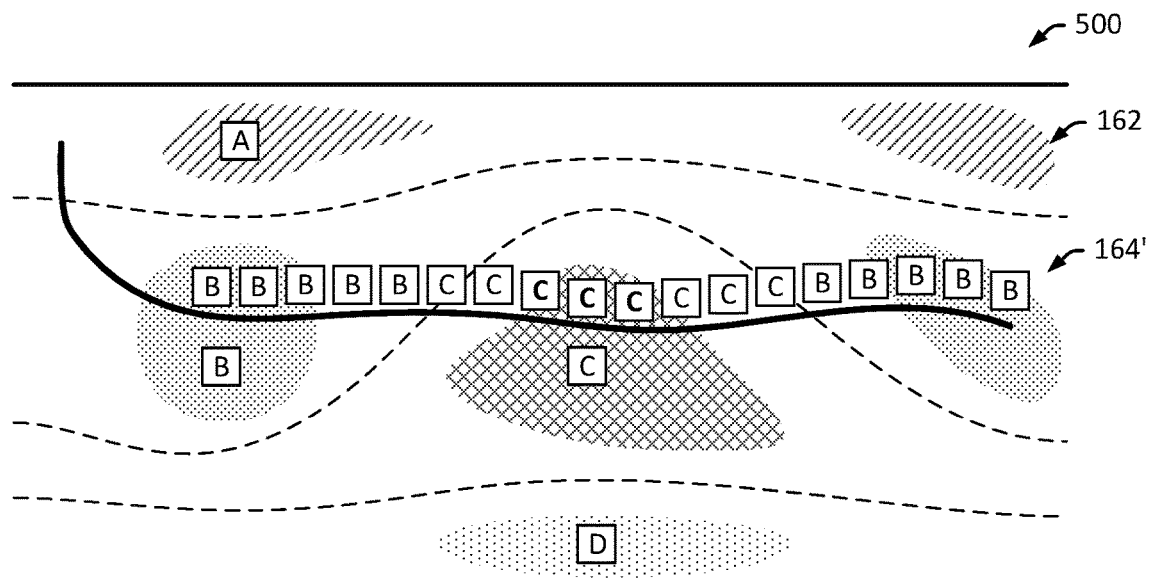
FIGS. 6A and 6B are diagrams that illustrate an example modified facies model in accordance with one or more embodiments.
Figure 6B:
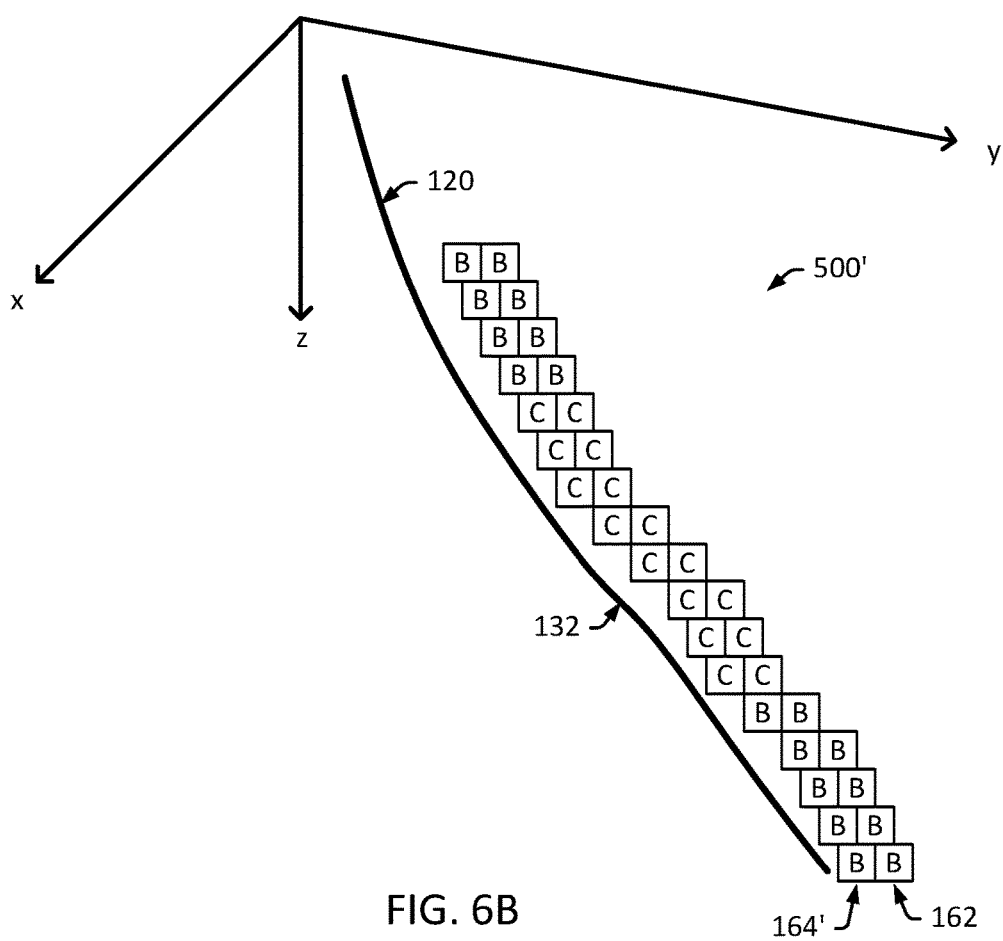

In some embodiments, method 200 includes determining a modified facies model (block 214). This may include, modifying a facies indicated for one or more locations within the current facies model to generate a modified facies model. For example, continuing with the prior example, determining a modified facies model may include the control system 122, in response to identifying the conflicts associated with the current facies model 164 indicating Rock Type D for the three locations in the middle segment of the horizontal portion 132 of the wellbore 120, modifying the facies log of the facies model 164 to indicate Rock Type C at each of the three locations, to generate a corresponding modified facies model 164'. FIGS. 6A and 6B are depictions of a modified facies model 164' in 2D and 3D, respectively, in accordance with one or more embodiments.

In some embodiments, method 200 includes developing a well based on a facies model (block 216). This may include, drilling, completing or producing a hydrocarbon well based on a facies model for the well. For example, developing a well based on a facies model may include the control system 122 determining a well parameter 170 of the horizontal portion 132 of the wellbore 120 of the well 106 based on the modified predicted facies model 164', and developing the well 106 in accordance with the parameter. The well parameter 170 may include, for example, a drilling parameter (e.g., a well trajectory), and the control system 122 (or another operator of the well 106) may control drilling of the well 106 in accordance with the drilling parameter (e.g., the well 106 may be drilled to follow the well trajectory). As a further example, the well parameter 170 may include a completion parameter (e.g., a location of casing perforations), and the control system 122 (or another operator of the well 106) may control completion of the well 106 in accordance with the completion parameter (e.g., the casing of the well 106 may be perforated at the specified location). As yet another example, the well parameter 170 may include a production parameter (e.g., an operating pressure or flowrate), and the control system 122 (or another operator of the well 106) may control production of the well 106 in accordance with the production parameter (e.g., the well 106 may be operated to maintain production fluid at the operating pressure or flowrate).

Figure 7:
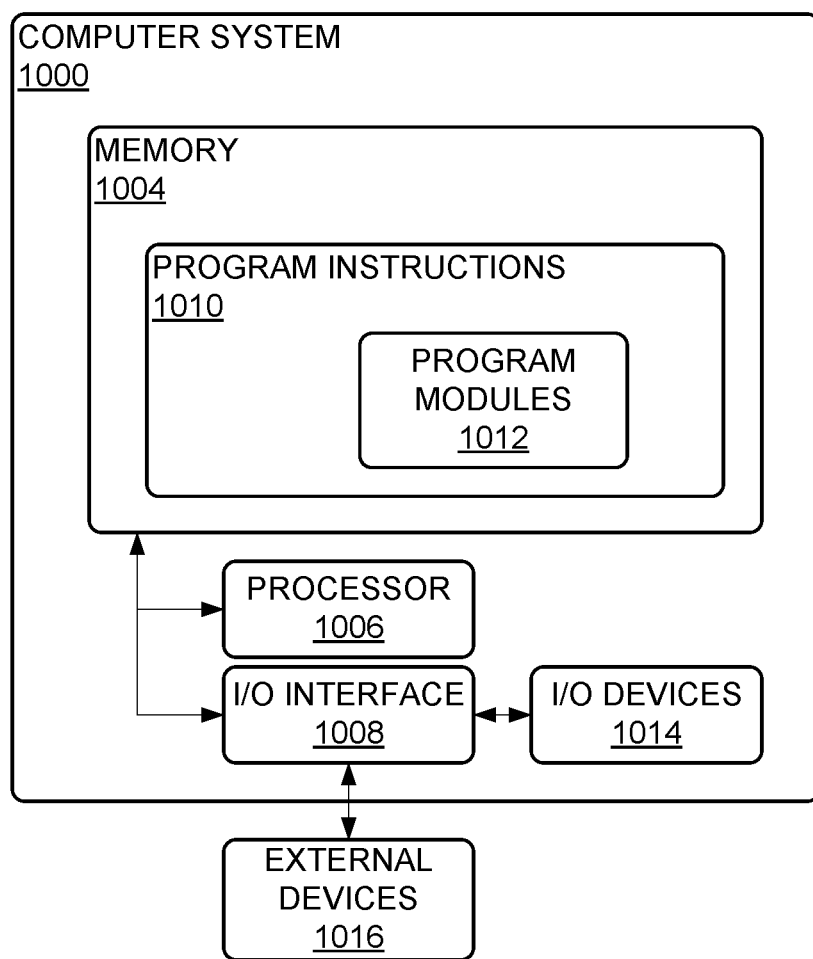
FIG. 7 is a diagram that illustrates an example computer system in accordance with one or more embodiments.

FIG. 7 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the control system 122 or the method 200.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (for example, an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include laboratory test systems, logging tools, or well drilling, completion, or production systems.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

It will be appreciated that the processes and methods described herein are example embodiments of processes and methods that may be employed in accordance with the techniques described herein. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of developing a hydrocarbon well, the method comprising:
   obtaining facies data for a subsurface formation, the facies data comprising:
      vertical wellbore core data obtained by way of core samples extracted from vertical portions of wellbores of wells that extend into the subsurface formation, the vertical wellbore core data comprising characteristics of the core samples measured in a core laboratory after extraction of the core; and
      wireline log data obtained by way of downhole logging of wellbores of wells that extend into the subsurface formation, the wireline log data comprising characteristics of rock of the subsurface formation measured in-situ by way of a downhole logging tool, the wireline log data comprising:
         vertical wireline log data that corresponds to downhole logging of vertical portions of the wellbores of the wells that extend into the subsurface formation; and
         horizontal wireline log data that corresponds to downhole logging of horizontal portions of the wellbores of the wells that extend into a target interval of the subsurface formation;
   determining, based on the vertical wellbore core data and the vertical wireline log data, a depositional model of the subsurface formation, wherein the depositional model comprises a 3D grid of the types and locations of rock of the subsurface formation based on the characteristics of the core samples and the characteristics of rock of the subsurface formation;
   determining, based on the facies data, a facies model of a horizontal portion of a wellbore of a hydrocarbon well that extends into the target interval of the subsurface formation, the facies model of the horizontal portion of the wellbore comprising a predicted facies log that identifies predicted facies of formation rock along a length of the horizontal portion of the wellbore of the hydrocarbon well, wherein determining the facies model comprises determining the facies model based artificial neural network (ANN) processing of the facies data;

determining, based on the depositional model, a facies thickness mapping of the subsurface formation, the facies thickness mapping identifying locations of facies of formation rock in the subsurface formation, the facies thickness mapping comprising a 3D grid of mapping the upper and lower bounding surfaces of the facies based on the types and locations of rock of the subsurface formation from the depositional model, wherein the facies thickness mapping further comprises first, second, and third boundaries that define bounding surfaces of first, second, third, and fourth rock layers of the subsurface formation, wherein the first boundary includes the earth's surface and the second and third boundaries define a reservoir that defines a target interval of the subsurface formation;

determining, based on a comparison of the predicted facies log and the facies thickness mapping, for each of one or more locations within the subsurface formation, a discrepancy between the predicted facies of formation rock indicated for the location by the predicted facies log and the facies of formation rock indicated for the location by the facies thickness mapping;

for one or more of the locations of a discrepancy identified, modifying the predicted facies for the location based on the facies of formation rock indicated for location by the facies thickness mapping, to generate a modified predicted facies log;

determining, based on the modified predicted facies log, a parameter of the horizontal wellbore of the hydrocarbon well; and developing the hydrocarbon well in accordance with the parameter.

2. The method of claim 1, wherein the comparison of the predicted facies log and the facies thickness mapping comprises simultaneous display of the predicted facies of formation rock along the length of the horizontal portion of the wellbore of the predicted facies log and corresponding facies of formation rock of the facies thickness mapping.

3. The method of claim 2, wherein the simultaneous display comprises display of the locations of predicted facies of formation rock and the corresponding facies of formation rock in three-dimensions and adjacent one another.

4. The method of claim 3, wherein the corresponding facies of formation rock are overlaid onto the display of the locations of predicted facies of formation rock.

5. The method of claim 1, wherein determining a second facies model for the hydrocarbon well is determined based on artificial neural network (ANN) processing of the modified predicted facies log.

6. The method of claim 1,
wherein the parameter comprises a drilling parameter, and developing the hydrocarbon well in accordance with the parameter comprises drilling the hydrocarbon well in accordance with the drilling parameter,
wherein the parameter comprises a completion parameter, and developing the hydrocarbon well in accordance with the parameter comprises completing the hydrocarbon well in accordance with the completion parameter, or
wherein the parameter comprises a production parameter, and developing the hydrocarbon well in accordance with the parameter comprises producing the hydrocarbon well in accordance with the production parameter.

7. A system for developing a hydrocarbon well, the system comprising:
a processor; and
a non-transitory computer readable storage medium comprising program instructions stored thereon that are executable by the processor to perform the following operations:
obtaining facies data for a subsurface formation, the facies data comprising:
vertical wellbore core data obtained by way of core samples extracted from vertical portions of wellbores of wells that extend into the subsurface formation, the vertical wellbore core data comprising characteristics of the core samples measured in a core laboratory after extraction of the core; and
wireline log data obtained by way of downhole logging of wellbores of wells that extend into the subsurface formation, the wireline log data comprising characteristics of rock of the subsurface formation measured in-situ by way of a downhole logging tool, the wireline log data comprising:
vertical wireline log data that corresponds to downhole logging of vertical portions of the wellbores of the wells that extend into the subsurface formation; and
horizontal wireline log data that corresponds to downhole logging of horizontal portions of the wellbores of the wells that extend into a target interval of the subsurface formation;
determining, based on the vertical wellbore core data and the vertical wireline log data, a depositional model of the subsurface formation, wherein the depositional model comprises a 3D grid of the types and locations of rock of the subsurface formation based on the characteristics of the core samples and the characteristics of rock of the subsurface formation;
determining, based on the facies data, a facies model of a horizontal portion of a wellbore of a hydrocarbon well that extends into the target interval of the subsurface formation, the facies model of the horizontal portion of the wellbore comprising a predicted facies log that identifies predicted facies of formation rock along a length of the horizontal portion of the wellbore of the hydrocarbon well, wherein determining the facies model comprises determining the facies model based artificial neural network (ANN) processing of the facies data;
determining, based on the depositional model, a facies thickness mapping of the subsurface formation, the facies thickness mapping identifying locations of facies of formation rock in the subsurface formation, the facies thickness mapping comprising a 3D grid of mapping the upper and lower bounding surfaces of the facies based on the types and locations of rock of the subsurface formation from the depositional model, wherein the facies thickness mapping further comprises first, second, and third boundaries that define bounding surfaces of first, second, third, and fourth rock layers of the subsurface formation, wherein the first boundary includes the earth's surface and the second and third boundaries define a reservoir that defines a target interval of the subsurface formation;
determining, based on a comparison of the predicted facies log and the facies thickness mapping, for each of one or more locations within the subsurface formation, a discrepancy between the predicted facies of formation rock indicated for the location by the predicted facies log and the facies of formation rock indicated for the location by the facies thickness mapping;

for one or more of the locations of a discrepancy identified, modifying the predicted facies for the location based on the facies of formation rock indicated for location by the facies thickness mapping, to generate a modified predicted facies log;

determining, based on the modified predicted facies log, a parameter of the horizontal wellbore of the hydrocarbon well; and developing the hydrocarbon well in accordance with the parameter.

8. The system of claim 7, wherein the comparison of the predicted facies log and the facies thickness mapping comprises simultaneous display of the predicted facies of formation rock along the length of the horizontal portion of the wellbore of the predicted facies log and corresponding facies of formation rock of the facies thickness mapping.

9. The system of claim 8, wherein the simultaneous display comprises display of the locations of predicted facies of formation rock and the corresponding facies of formation rock in three-dimensions and adjacent one another.

10. The system of claim 9, wherein the corresponding facies of formation rock are overlaid onto the display of the locations of predicted facies of formation rock.

11. The system of claim 7, wherein determining a second facies model for the hydrocarbon well is determined based on artificial neural network (ANN) processing of the modified predicted facies log.

12. The system of claim 7,
wherein the parameter comprises a drilling parameter, and developing the hydrocarbon well in accordance with the parameter comprises drilling the hydrocarbon well in accordance with the drilling parameter, wherein the parameter comprises a completion parameter, and developing the hydrocarbon well in accordance with the parameter comprises completing the hydrocarbon well in accordance with the completion parameter, or wherein the parameter comprises a production parameter, and developing the hydrocarbon well in accordance with the parameter comprises producing the hydrocarbon well in accordance with the production parameter.

13. A non-transitory computer readable storage medium comprising program instructions stored thereon that are executable by a processor to perform the following operations for developing a hydrocarbon well:

obtaining facies data for a subsurface formation, the facies data comprising:

vertical wellbore core data obtained by way of core samples extracted from vertical portions of wellbores of wells that extend into the subsurface formation, the vertical wellbore core data comprising characteristics of the core samples measured in a core laboratory after extraction of the core; and wireline log data obtained by way of downhole logging of wellbores of wells that extend into the subsurface formation, the wireline log data comprising characteristics of rock of the subsurface formation measured in-situ by way of a downhole logging tool, the wireline log data comprising:

vertical wireline log data that corresponds to downhole logging of vertical portions of the wellbores of the wells that extend into the subsurface formation; and horizontal wireline log data that corresponds to downhole logging of horizontal portions of the wellbores of the wells that extend into a target interval of the subsurface formation;

determining, based on the vertical wellbore core data and the vertical wireline log data, a depositional model of the subsurface formation, wherein the depositional model comprises a 3D grid of the types and locations of rock of the subsurface formation based on the characteristics of the core samples and the characteristics of rock of the subsurface formation;

determining, based on the facies data, a facies model of a horizontal portion of a wellbore of a hydrocarbon well that extends into the target interval of the subsurface formation, the facies model of the horizontal portion of the wellbore comprising a predicted facies log that identifies predicted facies of formation rock along a length of the horizontal portion of the wellbore of the hydrocarbon well, wherein determining the facies model comprises determining the facies model based artificial neural network (ANN) processing of the facies data;

determining, based on the depositional model, a facies thickness mapping of the subsurface formation, the facies thickness mapping identifying locations of facies of formation rock in the subsurface formation, the facies thickness mapping comprising a 3D grid of mapping the upper and lower bounding surfaces of the facies based on the types and locations of rock of the subsurface formation from the depositional model, wherein the facies thickness mapping further comprises first, second, and third boundaries that define bounding surfaces of first, second, third, and fourth rock layers of the subsurface formation, wherein the first boundary includes the earth's surface and the second and third boundaries define a reservoir that defines a target interval of the subsurface formation;

determining, based on a comparison of the predicted facies log and the facies thickness mapping, for each of one or more locations within the subsurface formation, a discrepancy between the predicted facies of formation rock indicated for the location by the predicted facies log and the facies of formation rock indicated for the location by the facies thickness mapping;

for one or more of the locations of a discrepancy identified, modifying the predicted facies for the location based on the facies of formation rock indicated for location by the facies thickness mapping, to generate a modified predicted facies log;

determining, based on the modified predicted facies log, a parameter of the horizontal wellbore of the hydrocarbon well; and developing the hydrocarbon well in accordance with the parameter.

14. The medium of claim 13, wherein the comparison of the predicted facies log and the facies thickness mapping comprises simultaneous display of the predicted facies of formation rock along the length of the horizontal portion of the wellbore of the predicted facies log and corresponding facies of formation rock of the facies thickness mapping.

15. The medium of claim 14, wherein the simultaneous display comprises display of the locations of predicted facies of formation rock and the corresponding facies of formation rock in three-dimensions and adjacent one another.

16. The medium of claim 15, wherein the corresponding facies of formation rock are overlaid onto the display of the locations of predicted facies of formation rock.

17. The medium of claim 13, wherein determining a second facies model for the hydrocarbon well is determined based on artificial neural network (ANN) processing of the modified predicted facies log.

\* \* \* \* \*